United States Patent
Upadhyay et al.

(10) Patent No.: US 11,232,002 B2
(45) Date of Patent: Jan. 25, 2022

(54) METHOD AND SYSTEM FOR SEAMLESS DATABASE BACKUP LIVE-MOUNTING USING SELF-CONTAINED DATABASE BACKUPS

(71) Applicant: EMC IP Holding Company LLC, Hopkinton, MA (US)

(72) Inventors: Navneet Upadhyay, Ghaziabad (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 190 days.

(21) Appl. No.: 16/782,099

(22) Filed: Feb. 5, 2020

(65) Prior Publication Data
US 2021/0240583 A1 Aug. 5, 2021

(51) Int. Cl.
*G06F 11/00* (2006.01)
*G06F 11/14* (2006.01)
*G06F 11/20* (2006.01)
*G06F 16/13* (2019.01)

(52) U.S. Cl.
CPC ...... *G06F 11/1469* (2013.01); *G06F 11/1451* (2013.01); *G06F 11/1458* (2013.01); *G06F 11/2069* (2013.01); *G06F 16/13* (2019.01); *G06F 2201/80* (2013.01); *G06F 2201/82* (2013.01)

(58) Field of Classification Search
CPC ............. G06F 11/1448; G06F 11/1451; G06F 11/1458; G06F 11/1469; G06F 11/2069; G06F 16/13; G06F 16/182; G06F 16/27; G06F 2201/80; G06F 2201/82
See application file for complete search history.

(56) References Cited

U.S. PATENT DOCUMENTS

2016/0085575 A1* 3/2016 Dornemann ........ G06F 11/2094 718/1
2021/0034474 A1* 2/2021 Khandkar ........... G06F 11/2069

OTHER PUBLICATIONS

Wahl, Chris, "Building a Live Mount Across New and Old Backups with Rubrik", Oct. 16, 2017, https://wahlnetwork.com (Year: 2017).*

* cited by examiner

*Primary Examiner* — Michael Maskulinski
(74) *Attorney, Agent, or Firm* — Chamberlain, Hrdlicka, White, Williams & Aughtry

(57) ABSTRACT

In general, in one aspect, the invention relates to a method for accessing backup data includes receiving a live mount connection request from a client device, in response to the live mount connection request: generating a directory, populating the directory with a backup control file image and a plurality of pointers to backup data file images in a second directory, wherein the backup control file image is obtained from the second directory, restoring at least a portion of the backup data file images in the directory using the backup control file image and at least a portion of the backup data file images in the second directory, and providing after the restoring, a handle to the directory to the client device.

20 Claims, 8 Drawing Sheets

METHOD AND SYSTEM FOR SEAMLESS DATABASE BACKUP LIVE-MOUNTING USING SELF-CONTAINED DATABASE BACKUPS

BACKGROUND

Database protection defines the process of protecting database data using a secondary storage. More specifically, protection of the database data often entails replicating database data, sending the replicated data to a secondary storage across a network, and storing the replicated data on the secondary storage.

SUMMARY

In general, in one aspect, the invention relates to a method for accessing backup data. The method includes receiving a live mount connection request from a client device and in response to the live mount connection request: generating a directory, populating the directory with a backup control file image and a plurality of pointers to backup data file images in a second directory, wherein the backup control file image is obtained from the second directory, restoring at least a portion of the backup data file images in the directory using the backup control file image and at least a portion of the backup data file images in the second directory, and providing, after the restoring, a handle to the directory to the client device.

In general, in one aspect, the invention relates to a system for accessing backup data that includes a processor and a backup mounting agent, which when executed by the processor, performs a method. The method includes receiving a live mount connection request from a client device and in response to the live mount connection request: generating a directory, populate the directory with a backup control file image and a plurality of pointers to backup data file images in a second directory, wherein the backup control file image is obtained from the second directory, restoring at least a portion of the backup data file images in the directory using the backup control file image and at least a portion of the backup data file images in the second directory, and providing, after the restoring, a handle to the directory to the client device.

In general, in one aspect, the invention relates to a non-transitory computer readable medium which includes computer readable program code, which when executed by a computer processor enables the computer processor to perform a method for accessing backup data. The method includes receiving a live mount connection request from a client device and in response to the live mount connection request: generating a directory, populating the directory with a backup control file image and a plurality of pointers to backup data file images in a second directory, wherein the backup control file image is obtained from the second directory, restoring at least a portion of the backup data file images in the directory using the backup control file image and at least a portion of the backup data file images in the second directory, and providing, after the restoring, a handle to the directory to the client device.

DETAILED DESCRIPTION

Figure 1A:
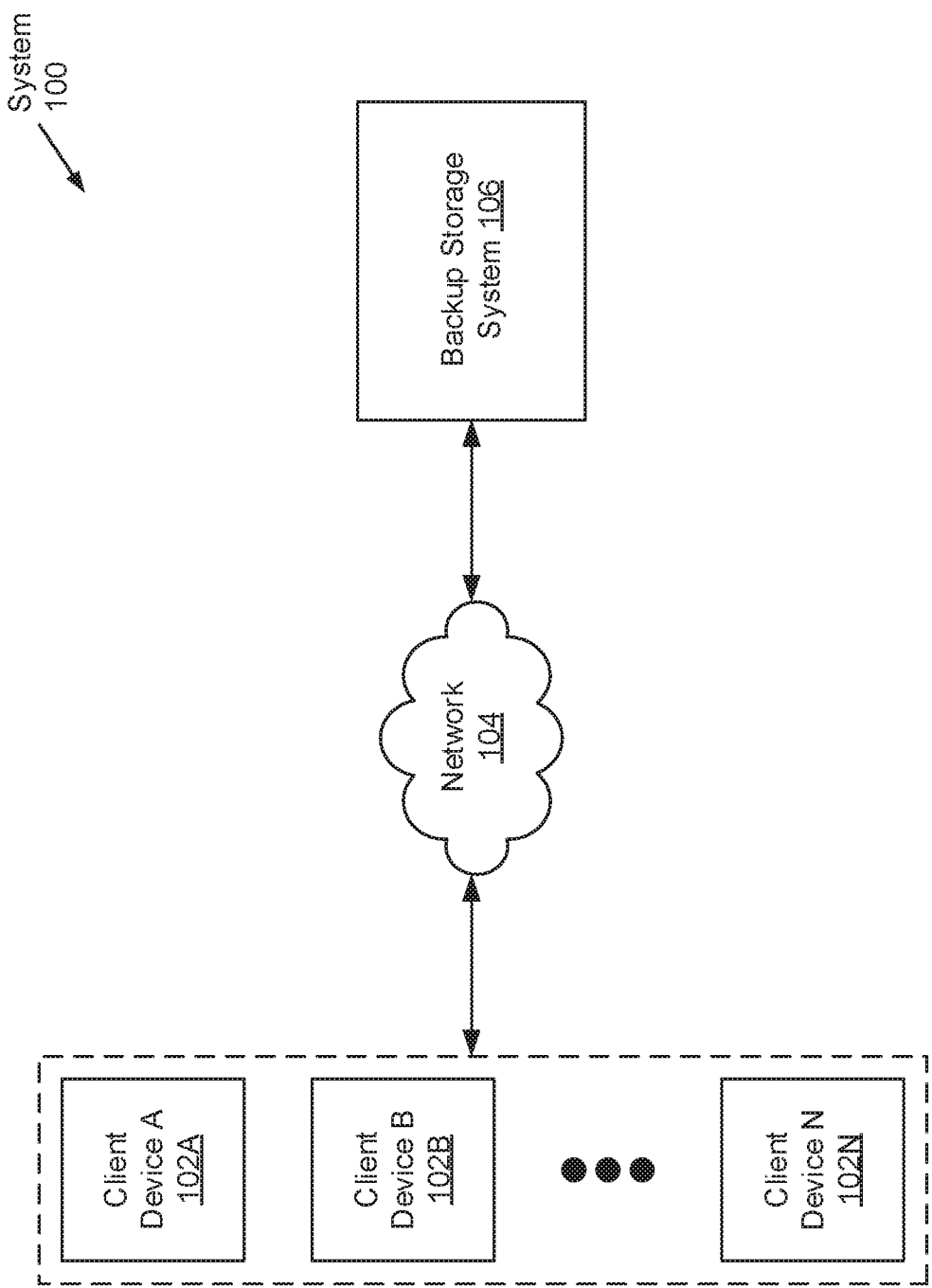
FIG. 1A shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for seamless database backup live-mounting using self-contained database backups. Specifically, one or more embodiments of the invention enables the generation of self-contained database backups, which include both backup database data and metadata required for seamless live-mounting. Further, in various embodiments of the invention, the self-contained backups are used for recovering database data—in entirety or at any granular level—without needing to provision storage resources for point-in-time database copies (i.e., backup database data), without needing to wait for large amounts of data, representative of the point-in-time database copies, to traverse a network from backup storage to a target device, through seamless live-mounting. Substantively, through seamless live-mounting, the physical point-in-time database data, as well as the associated structural metadata, may be retained on backup storage while a pointer-based snapshot, mapping to the physical point-in-time database data and structural metadata, may be generated thereon. Thereafter, a file system—mapping to the pointer-based snapshot on the backup storage—may be mounted on the target device, which exposes an interface through which the backup database data may be accessed and/or manipulated using a distributed file system protocol.

FIG. 1A shows a system in accordance with one or more embodiments of the invention. The system (100) may include one or more client devices (102A-102N) operatively connected to a backup storage system (106). Each of these system (100) components is described below.

In one embodiment of the invention, the above-mentioned system (100) components may operatively connect to one another through a network (104) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a client device (102A-102N) may represent any physical appliance or computing system designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network (104). Further, in providing an execution environment for any computer programs installed thereon, a client device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a client device (102A-102N) may perform other functionalities without departing from the scope of the invention. Examples of a client device (102A-102N) may include, but are not limited to, a desktop computer, a laptop computer, a server, a mainframe, or any other computing system similar to the exemplary computing system shown in FIG. 5. Moreover, client devices (102A-102N) are described in further detail below with respect to FIG. 1B.

In one embodiment of the invention, the backup storage system (106) may represent a data backup, archiving, and/or disaster recovery storage system. The backup storage system (106) may be implemented using one or more servers (not shown). Each server may refer to a physical server, which may reside in a datacenter, or a virtual server, which may reside in a cloud computing environment. Additionally or alternatively, the backup storage system (106) may be implemented using one or more computing systems similar to the exemplary computing system shown in FIG. 5. Furthermore, the backup storage system (106) is described in further detail below with respect to FIG. 1C.

While FIG. 1A shows a configuration of components, other system (100) configurations may be used without departing from the scope of the invention.

Figure 1B:
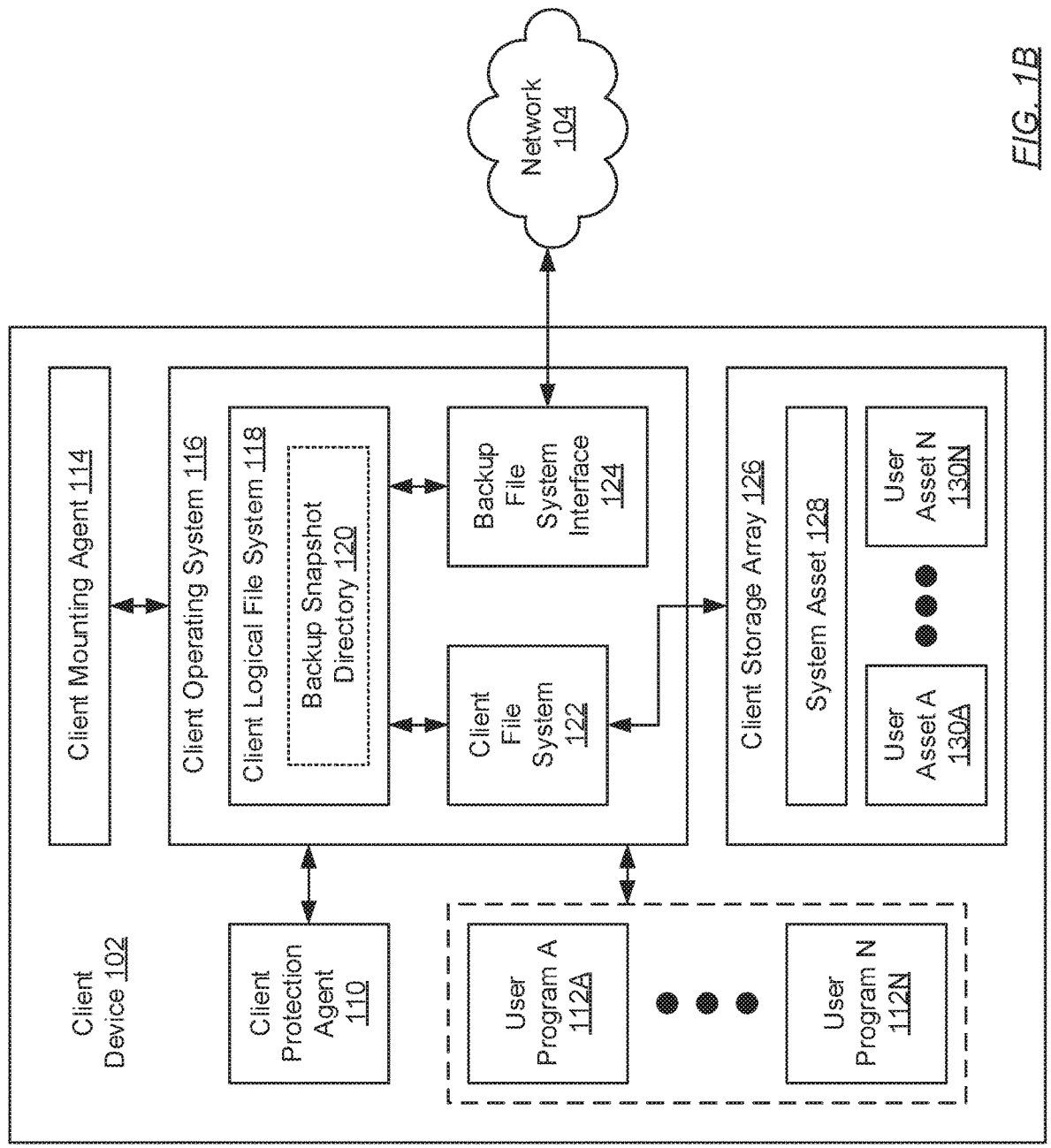
FIG. 1B shows a client device in accordance with one or more embodiments of the invention.

FIG. 1B shows a client device in accordance with one or more embodiments of the invention. The client device (102) may include a client protection agent (110), one or more user programs (112A-112N), a client mounting agent (114), a client operating system (116), and a client storage array (126). Each of these client device (102) components is described below.

In one embodiment of the invention, the client protection agent (110) may refer to a computer program that may execute on the underlying hardware of the client device (102). Specifically, the client protection agent (110) may be designed and configured to perform client-side database backup and recovery operations. To that extent, the client protection agent (110) may protect one or more databases (also referred herein as a system asset (128) and/or user assets (130A-130N)) on the client device (102) against data loss (i.e., backup the database(s)); and reconstruct one or more databases on the client device (102) following such data loss (i.e., recover the database(s)). One of ordinary skill will appreciate that the client protection agent (110) may perform other functionalities without departing from the scope of the invention.

In one embodiment of the invention, a user program (112A-112N) may refer to a computer program that may execute on the underlying hardware of the client device (102). Specifically, a user program (112A-112N) may be designed and configured to perform one or more functions, tasks, and/or activities instantiated by a user of the client device (102). Accordingly, towards performing these operations, a user program (112A-112N) may include functionality to request and consume client device (102) resources (e.g., computer processors, memory, storage (126), virtualization, network bandwidth, etc.) by way of service calls to the client operating system (116). One of ordinary skill will appreciate that a user program (112A-112N) may perform other functionalities without departing from the scope of the invention. Examples of a user program (112A-112N) may include, but are not limited to, a word processor, an email client, a database client, a web browser, a media player, a file viewer, an image editor, a simulator, a computer game, or any other computer executable application.

In one embodiment of the invention, the client mounting agent (114) may refer to a computer program that may execute on the underlying hardware of the client device (102). Specifically, the client mounting agent (114) may be designed and configured to perform client-side database mounting and unmounting operations. To that extent, the client mounting agent (114) may include functionality to perform one or more of the various steps outlined below with respect to FIG. 3, which may be directed to facilitating the establishment of a backup database data live mount (or mounting point) (described below) on the client device (102) in response to a user program (112A-112N) backup database data access request. One of ordinary skill will appreciate that the client mounting agent (114) may perform other functionalities without departing from the scope of the invention.

In one embodiment of the invention, live-mounting may refer to a data recovery mechanism that provides the restoration of databases—in entirety or at any granular level—without needing to provision storage resources for point-intime database copies (i.e., backup database data), or without needing to wait for large amounts of data, representative of the point-in-time database copies, to traverse the network (104) from the backup storage system (106) to the client device (102). In one embodiment of the invention, through live-mounting, the physical point-in-time database data, as well as the structural metadata descriptive of the backup database(s) (e.g., control file(s) (described below)), may be retained on the backup storage system (106) while a pointer-based snapshot, mapping to the physical point-in-time database data and structural metadata, may be generated thereon. Thereafter, a file system—mapping to the pointer-based snapshot created on the backup storage system (106)—may be mounted on the client device (102). The mounted file system exposes an interface through which one or more user programs (112A-112N) may access and manipulate (i.e., perform file operations on) the created pointer-based snapshot on the backup storage system (106). Meanwhile, a distributed file system protocol may be employed between the client device (102) and the backup storage system (106) to facilitate the backup database data interaction.

In one embodiment of the invention, the client operating system (116) may refer to a computer program that may execute on the underlying hardware of the client device (102). Specifically, the client operating system (116) may be designed and configured to oversee client device (102) operations. To that extent, the client operating system (116) may include functionality to, for example, support fundamental client device (102) functions; schedule tasks; mediate interactivity between logical (e.g., software) and physical (e.g., hardware) client device (102) components; allocate client device (102) resources; and execute or invoke other computer programs executing on the client device (102). One of ordinary skill will appreciate that the client operating system (116) may perform other functionalities without departing from the scope of the invention.

For example, the client operating system (116) may facilitate user program (112A-112N) interaction with user asset (130A-130N) data stored locally on the client device (102) or remotely over the network (104). In facilitating the aforementioned interaction, the client operating system (116) may implement a client logical file system (118). The client logical file system (118) may represent a collection of in-memory data structures maintained, by the client operating system (116), to manage the various accessible user asset (130A-130N) data stored locally on the client device (102) and/or remotely on the backup storage system (106). Further, the client logical file system (118) may expose an application programming interface (API) through which the user program(s) (112A-112N) may manipulate—i.e., via one or more file operations—any granularity of locally and/or remotely stored user asset (130A-130N) data. These file operations, requested by the user program(s) (112A-112N), may subsequently be delivered to the client file system (122) or backup file system interface (124) for processing.

In one embodiment of the invention, the backup snapshot directory (120) may refer to a collection of in-memory data structures used to organize and manage backup database data—in entirety or at granular levels—retained amongst the backup file system (106). Further, the backup snapshot directory (120) may be mounted at a given mount point within the client logical file system (118). Also, a mount point may refer to a directory path through which the backup database data, retained amongst the backup storage system (106), may be accessed logically by user programs (112A-112N) and other entities on the client device (102). Moreover, following the creation and mounting of the backup snapshot directory (120), a backup snapshot directory handle (not shown) may be obtained. The backup snapshot directory handle may represent a referencing object, assigned by the client operating system (116) on the client device (102), which may be used by user programs (112A-112N) or other entities on the client device (102) to logically access the backup database data retained amongst the backup snapshot directory (120).

In one embodiment of the invention, the client file system (122) may represent a physical file system (also referred to as a file system implementation). A physical file system may refer to a collection of subroutines concerned with the physical operation of one or more physical storage devices (described below). The client file system (122), in this respect, may be concerned with the physical operation of the client storage array (126). Accordingly, the client file system (122) may employ client storage array (126) device drivers (or firmware) (not shown) to process requested file operations from the user program(s) (112A-112N). Device drivers enable the client file system (122) to manipulate physical storage or disk blocks as appropriate.

In one embodiment of the invention, the backup file system interface (124) may represent a computer program that may execute on the underlying hardware of the client device (102). Specifically, the backup file system interface (124) may be designed and configured to facilitate the access and manipulation of remotely stored database data as if the aforementioned database data were stored locally on the client device (102). Accordingly, the backup file system interface (124) may, in part, implement a distributed file system (DFS), which may employ any known DFS protocol (e.g., the network file system (NFS) protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device (102)) across the network (104). Furthermore, the backup file system interface (124) may include functionality to issue remote procedure calls (RPCs) directed to accessing and manipulating any granularity of database data remotely stored on the backup storage system (106). The invention is not limited to the aforementioned protocols.

In one embodiment of the invention, the client storage array (126) may refer to a collection of one or more physical storage devices (not shown) on which various forms of digital data—e.g., a system asset (128) and one or more user assets (130A-130N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (126) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or more embodiments of the invention, a system asset (128) may represent a database, or a logical container to and from which related digital data, or any granularity thereof, may be stored and retrieved, respectively. A system asset (128) may occupy a portion of a physical storage device or, alternatively, may span across multiple physical storage devices, of the client storage array (126). Furthermore, a system asset (128) may refer to a composite of various database objects including, but not limited to, one or more recovery catalogs (discussed below, not shown).

In one embodiment of the invention, an user asset (130A-130N) may represent a database, or a logical container to and from which related digital data, or any granularity thereof, may be stored and retrieved, respectively. An user asset (130A-130N) may occupy a portion of a physical storage device or, alternatively, may span across multiple physical storage devices, of the client storage array (126). Furthermore, an user asset (130A-130N) may refer to a composite of various database objects including, but not limited to, one or more data files, and one or more control files, and one or more parameter files (all not shown). Each of these user asset (130A-130N) subcomponents is described below.

In one embodiment of the invention, a data file may refer to a database object that stores database data. Database data may encompass computer readable content (e.g., images, text, video, audio, machine code, any other form of computer readable content, or a combination thereof), which may be generated, interpreted, and/or processed by any given user program (112A-112N). Further, a data file may store database data in (a) undeduplicated form or (b) deduplicated form. In brief, the latter form of database data may be produced through the application of data deduplication on the former form of the database data. That is, undeduplicated database data may entail computer readable content that may or may not include redundant information. In contrast, deduplicated database data may result from the elimination of any redundant information found throughout the undeduplicated computer readable content and, accordingly, may instead reflect a content recipe of the undeduplicated computer readable content. A content recipe may refer to a sequence of chunk identifiers (or pointers) associated with (or directed to) unique database data chunks consolidated in physical storage. Collectively, the sequence of chunk identifiers (or pointers)—representative of the deduplicated database data—may be used to reconstruct the corresponding undeduplicated database data. Moreover, a given chunk identifier for a given database data chunk may encompass a cryptographic fingerprint or hash of the given database data chunk.

In one embodiment of the invention, a recovery catalog may refer to a database object that stores backup operation metadata. The recovery catalog may include entries for one or more backup operations. The recovery catalog entries may include metadata that includes information regarding successfully backed-up data files for a backup operation. The metadata may include data file identifiers, user asset identifiers, data file storage locations, and/or other types of metadata without departing from the scope of the invention.

In one embodiment of the invention, a control file may refer to a database object that stores system asset (128) and/or user asset (130A-130N) metadata (also referred to as database metadata). Database metadata may encompass information descriptive of the database (or system asset (128) and/or user asset (130A-130N)) status and structure. By way of examples, database metadata may include, but are not limited to, a database name assigned to the system asset (128) and/or user asset (130A-130N), the name(s) and storage location(s) of one or more data files associated with the system asset (128) and/or user asset (130A-130N), a creation timestamp encoding the date and/or time marking the creation of the system asset (128) and/or user asset (130A-130N), etc.

In one embodiment of the invention, a parameter file may refer to a database object that stores parameters of user assets (130A-130N). A parameter file may include a list of initialization parameters and a value for each parameter for a particular user asset (130A-130N). A parameter file may serve to recover the user asset (130A-130N) should a failover occur, or to apply initialization parameter values to a recovered user asset (130A-130N) which may have transpired during the database recovery process.

While FIG. 1B shows a configuration of components, other client device (102) configurations may be used without departing from the scope of the invention.

Figure 1C:
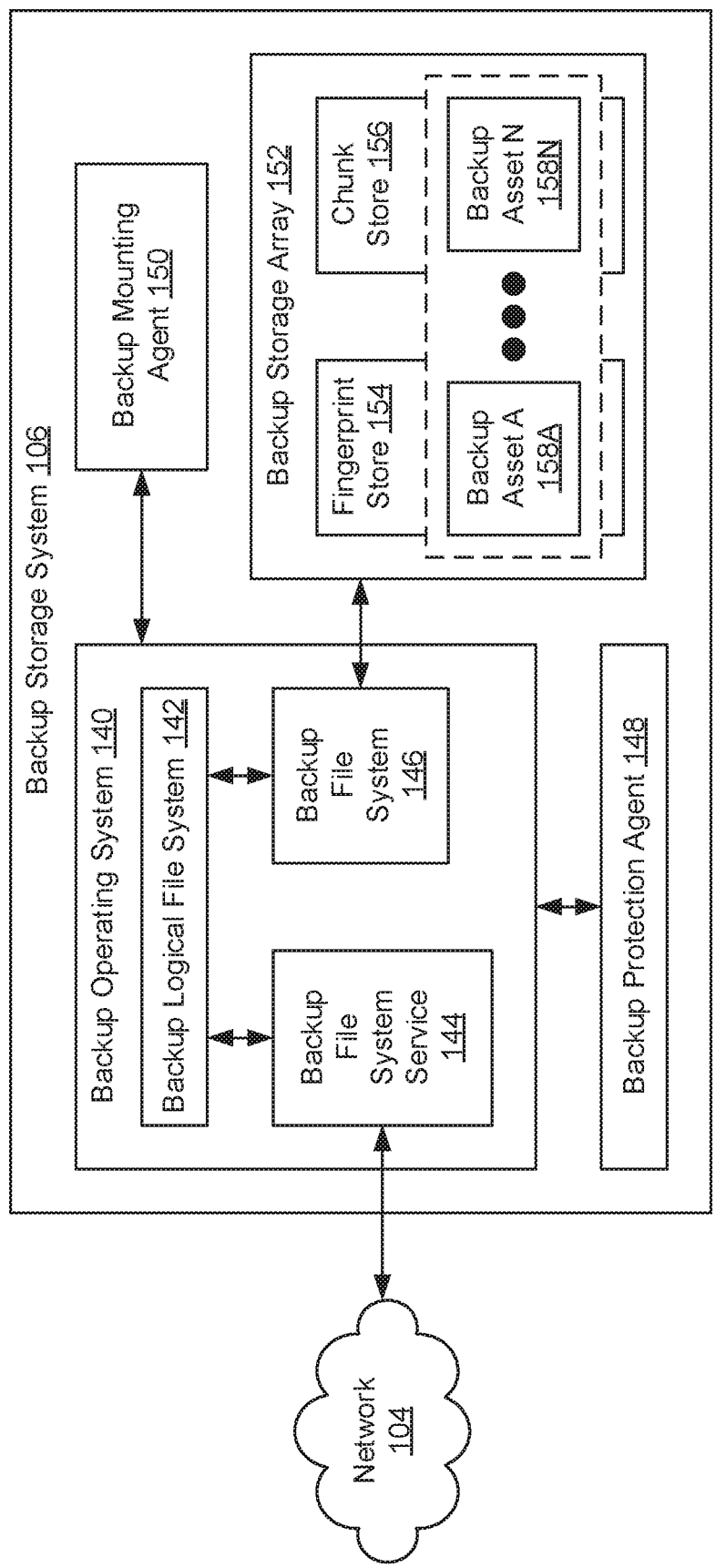
FIG. 1C shows a backup storage system in accordance with one or more embodiments of the invention.

FIG. 1C shows a backup storage system (106) in accordance with one or more embodiments of the invention. The backup storage system (106) may include a backup operating system (140), a backup protection agent (148), a backup mounting agent (150), and a backup storage array (152). Each of these backup storage system (106) components is described below.

In one embodiment of the invention, the backup operating system (140) may refer to a computer program that may execute on the underlying hardware of the backup storage system (106). Specifically, the backup operating system (140) may be designed and configured to oversee backup storage system (106) operations. To that extent, the backup operating system (140) may include functionality to, for example, support fundamental backup storage system (106) functions; schedule tasks; mediate interactivity between logical (e.g., software) and physical (e.g., hardware) backup storage system (106) components; allocate backup storage system (106) resources; and execute or invoke other computer programs executing on the backup storage system (106). One of ordinary skill will appreciate that the backup operating system (140) may perform other functionalities without departing from the scope of the invention.

For example, the backup operating system (140) may facilitate backup asset (158A-158N) access and manipulation by one or more computer programs (e.g., backup protection agent (148) or the backup mounting agent (150)) executing locally on the backup storage system (106) or, alternatively, by one or more remote computing systems (e.g., client device (102)) over the network (104). In facilitating the aforementioned interaction, the backup operating system (140) may implement a backup logical file system (142). The backup logical file system (142) may represent a collection of in-memory data structures maintained, by the backup operating system (140), to manage the various accessible backup asset (158A-158N) data stored locally on the backup storage system (106). Further, the backup logical file system (142) may expose an application programming interface (API) through which the local computer programs and/or remote computing systems may manipulate—i.e., via one or more file operations—any granularity of locally stored backup asset (158A-158N) data. File operations, requested by the local computer programs, may be delivered to the backup file system (146) for processing, whereas file operations, requested by the remote computing systems, may be received and processed by the backup file system service (144).

In one embodiment of the invention, the backup file system service (144) may represent a computer program that may execute on the underlying hardware of the backup storage system (106). Specifically, the backup file system service (144) may be designed and configured to facilitate the authorized, remote access and manipulation of locally stored backup database data. Accordingly, the backup file system service (144) may, in part, implement a DFS, which may employ any known DFS protocol (e.g., the network file system (NFS) protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device (102)) across the network (104). Furthermore, the backup file system service (144) may include functionality to service remote procedure calls (RPCs) directed to accessing and manipulating any granularity of backup database data locally stored on the backup storage system (106). The invention is not limited to the aforementioned protocols.

In one embodiment of the invention, the backup file system (146) may represent a physical file system (also referred to as a file system implementation). A physical file system may refer to a collection of subroutines concerned with the physical operation of one or more physical storage devices (described below). The backup file system (146), in this respect, may be concerned with the physical operation of the backup storage array (152). Accordingly, the backup file system (146) may employ backup storage array (152) device drivers (or firmware) (not shown) to process requested file operations from the local computer programs or the remote computing systems (via the backup file system service (144)). Device drivers enable the backup file system (146) to manipulate physical storage or disk blocks as appropriate.

In one embodiment of the invention, the backup mounting agent (150) may refer to a computer program that may execute on the underlying hardware of the backup storage system (106). Specifically, the backup mounting agent (150) may be designed and configured to perform storage-side database mounting operations. To that extent, the backup mounting agent (150) may include functionality to perform the various steps outlined below with respect to FIG. 4, which may be directed to facilitating the establishment of a backup database data live mount (or mounting point) (described above) on the client device (102) in response to a user program (112A-112N) backup database data access request. One of ordinary skill will appreciate that the backup mounting agent (150) may perform other functionalities without departing from the scope of the invention.

In one embodiment of the invention, the backup storage array (152) may refer to a collection of one or more physical storage devices (not shown) on which various forms of digital data—e.g., one or more backup assets (158A-158N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (152) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the backup storage array (152) may include a fingerprint store (154) and a chunk store (156), which may collectively include deduplicated database data. Deduplicated database data may result from the elimination of any redundant information found throughout the database data in undeduplicated form. Accordingly, instead of reflecting the binary composition of the undeduplicated database data in its entirety, deduplicated database data may alternatively reflect reduced information in the form of a content recipe of the representative, undeduplicated computer readable content. The aforementioned content recipe may refer to a sequence of chunk identifiers (or pointers) associated with (or directed to) unique database data chunks identified throughout the undeduplicated database data. Any unique database data chunks, along with their respective chunk identifiers (i.e., cryptographic fingerprints or hashes), may be indexed in appropriate physical storages—e.g., the chunk store (156) and the fingerprint store (154), respectively.

In one embodiment of the invention, the fingerprint store (154) may represent a repository for maintaining chunk identifiers. Each chunk identifier may be indexed by way of a fingerprint store (154) entry (not shown), which may store a mapping relating the chunk identifier to a storage identifier. A chunk identifier (also referred to as a fingerprint or hash) may represent a digital signature that uniquely identifies an associated database data chunk. Further, a chunk identifier may be produced by submitting the associated database data chunk through a hash function, which may employ any existing cryptographic mapping algorithm. As such, a chunk identifier may be outputted by the hash function given the associated database data chunk as input. Meanwhile, a storage identifier may represent a character or bit string that uniquely identifies a storage location in the backup storage array (152). By way of an example, a storage identifier may encompass a tuple reflecting (a) a storage device identifier uniquely assigned to a given physical storage device (not shown) of the backup storage array (152); and (b) a binary address assigned to a starting byte (or storage block) in the given physical storage device at which the database data chunk may be physically stored.

On the other hand, in one embodiment of the invention, the chunk store (156) may represent a repository for maintaining unique database data chunks. Each unique database data chunk may be indexed by way of a chunk store (156) entry (not shown), which may store a mapping relating a storage identifier (described above) to the unique database data chunk. A database data chunk may refer to a fragment or a partition of deduplicated database data. More specifically, a database data chunk may capture a unique byte pattern that may occur or recur throughout the undeduplicated database data.

In one embodiment of the invention, a backup asset (158A-158N) may refer to a deduplicated backup copy of a given user asset (130A-130N) (see e.g., FIG. 1B). For example, a backup asset (158A-158N) may represent a database, or a logical container to and from which related digital data, or any granularity thereof, may be stored and retrieved, respectively. A backup asset (158A-158N) may occupy a portion of a physical storage device or, alternatively, may span across multiple physical storage devices, of the backup storage array (152). Furthermore, a backup asset (158A-158N) may include a combination of various database objects including, but not limited to, one or more data files, one or more parameter files, and one or more control files (all described above).

While FIG. 1C shows a configuration of components, other backup storage system (106) configurations may be used without departing from the scope of the invention.

Figure 1D:
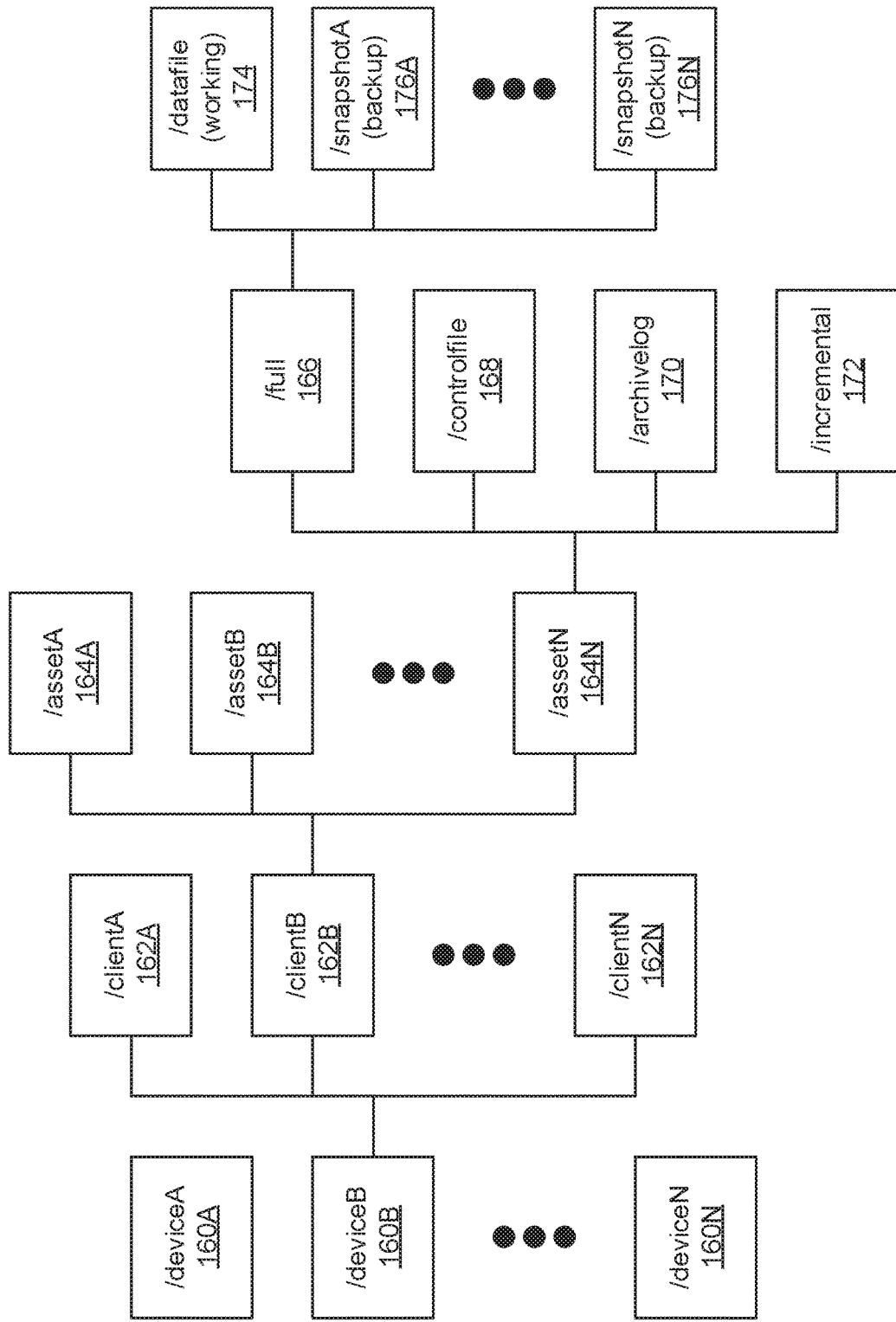
FIG. 1D shows an exemplary backup logical file system in accordance with one or more embodiments of the invention.

FIG. 1D shows an exemplary backup logical file system in accordance with one or more embodiments of the invention. A backup logical file system (142) may include one or more directories. In one embodiment of invention, a directory may be a file system cataloguing structure that includes references to other data files and/or other directories. Files may be organized by storing related files in the same directory. The backup logical file system (142) may include one or more directory hierarchies. In other words, there may be one or more directories that include subdirectories, (i.e., directories inside directories).

The backup logical file system (142) may include one or more storage device directories (i.e., /deviceA-/deviceN (160A-160N)). Each storage device directory (160A-160N) may include one or more client device directories (i.e., /clientA-/clientN (162A-162N)). Each client device directory (162A-162N) may include one or more asset directories (i.e., /assetA-/assetN (164A-164N)). Each asset directory (164A-164N) may include a full backup directory (i.e., /full (166)), a control file directory (i.e., /controlfile (168)), an archive log directory (i.e., /archivelog (170)), and an incremental backup directory (i.e., /incremental (172)). The full backup directory (166) may include a data file directory, or working directory, (i.e., /datafile (174)), and one or more snapshot, or backup, directories (i.e., /snapshotA-/snapshot (176A-176N)). Each directory and subdirectory is discussed below.

In one embodiment of the invention, a device directory (160A-160N) may refer to a directory that includes all of the backup data stored on a storage device of the backup storage system (106). As discussed above, the backup storage system (106) may include one or more servers or computing devices. A device directory (160A-160N) may include all of the backup data stored on a server or computing device including backup data from one or more client devices (102A-102N) and one or more user assets (130A-130N).

In one embodiment of the invention, a client directory (162A-162N) may refer to a directory that includes all of the backup data stored on a storage device of the backup storage system (106) that is associated with a particular client device (102A-102N). As discussed above, there may be one or more client devices (102A-102N) that store backup data into the backup storage system. The backup data stored in a client directory may be associated with one or more user assets (130A-130N) on the client device associated with the client directory (162A-162N).

In one embodiment of the invention, an asset directory (164A-164N) may refer to a directory that includes all backup data associated with a particular user asset (130A-130N). As discussed above, there may be one or more user assets (130A-130N) from which backup data is stored in the backup storage system (106).

In one embodiment of the invention, a full backup directory (166) may refer to a directory that includes all data associated with full image backups. A full backup directory my include a data file (working) directory (174) and one or more snapshot (backup) directories (176A-176N). A full backup directory (166) may include, one or more full backup data file images of user asset (130A-130N) data files, one or more clones of full backup data file images of user asset (130A-130N), one or more control file image backups, and one or more parameter file image backups (all not shown).

In one or more embodiments of the invention, a control file directory may refer to a directory that includes all of the control files associated with an user asset (130A-130N). A control file directory may include any number of backup control file images associated with an user asset (126A-126N) that are also associated with particular point in time.

In one embodiment of the invention, an archive log directory (170) may refer to a directory that includes all archive log files associated with an user asset (130A-130N). An archive log file directory may include any number of backup archive log file images associated with an user asset (126A-126N) that are also associated with particular point in time.

In one embodiment of the invention, an incremental backup directory (172) may refer to a directory that includes unmerged incremental data file images associated with an user asset (130A-130N). Incremental data file images may be stored in the incremental backup directory before being merged with existing full data file images to generate new full data file images in the data file (working) directory.

In one embodiment of the invention, a data file directory (174) (also referred to as a working directory) may refer to a directory in which all full backup data file images from the client device are written into and cloned from during backup operations.

In one embodiment of the invention, a snapshot directory (176A-176N) (also referred to a backup directory) may refer to a directory in which clones of full backup data file images, control file images, and/or parameter file images are stored. Each snapshot directory (176A-176N) may be used to restore an associated user asset (130A-130N) to a point in time associated with the backup data file images.

While FIG. 1D shows a configuration of components, other backup logical file system (142) configurations may be used without departing from the scope of the invention.

Figure 2:
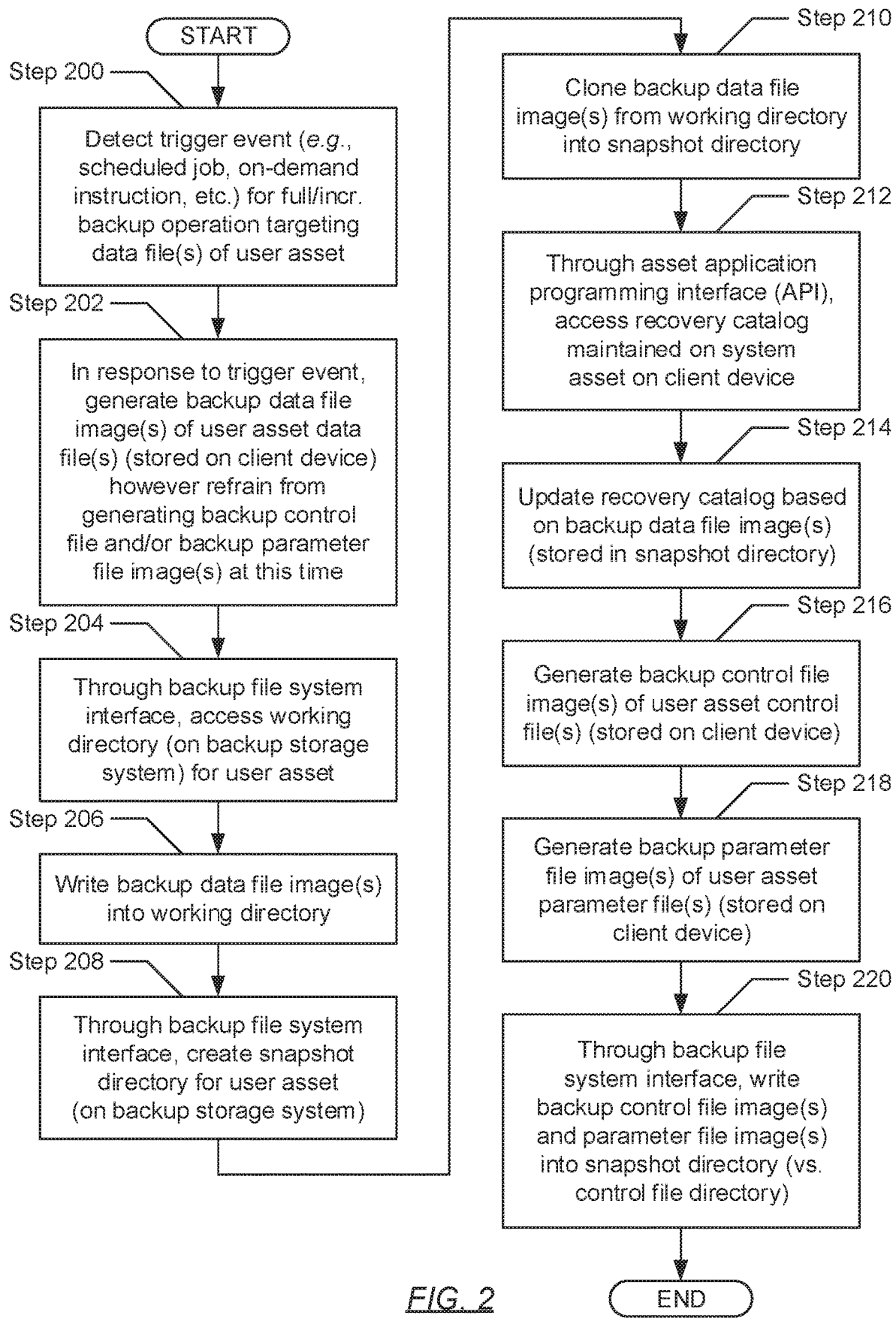
FIG. 2 shows a flowchart describing a method for generating self-contained database backups in accordance with one or more embodiments of the invention.

FIG. 2 shows a flowchart describing a method for generating self-contained database backups in accordance with one or more embodiments of the invention. The various steps outlined below may be performed by the client protection agent (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a trigger event for a full or incremental backup operation for a targeting data file(s) of a user asset on a client device is detected. In one embodiment of the invention, the trigger event may be a scheduled job, an on-demand instruction, or any other event that triggers a full or incremental backup operation. An incremental or full backup operation trigger event may be, for example, a scheduled job or an on-demand instruction, or any other event that triggers an incremental or full backup operation. A scheduled job may be a job that is a part of an incremental or full backup operation schedule created and maintained by a database administrator. An incremental backup operation schedule may lay out specific points in time an incremental or full backup operation is to be performed. For example, an incremental backup operation schedule may specify an incremental backup operation be performed twice a day at midnight and noon. An on-demand instruction may specify an instruction to perform an unscheduled incremental or full backup operation.

In Step 202, in response to the trigger event, a backup data file image(s) of a user asset data file(s) stored on the client device is/are generated and stored on the client device. However, in one embodiment of the invention, the method may refrain from generating a backup control file and/or a backup parameter file image(s) at this time. The user asset data file(s) may be stored locally on the client device. The generated backup data file images may be incremental backup data file images or full backup data file images. Further, the backup data file image(s) may be generated in deduplicated form and, thus, may include a backup content recipe. A content recipe may refer to a sequence of chunk identifiers (or pointers) associated with (or directed to) unique database data chunks indexed in physical storage—e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the backup content recipe may convey a sequence of fingerprints collectively representative of the undeduplicated incremental or full backup content.

In Step 204, the working directory for the user asset on the backup storage system is accessed through the backup file system interface. In one embodiment of the invention, the backup file system interface may allow the client device and entities within to access and manipulate directories and files on the backup storage system. The client device or entities on the client device may use an asset directory identifier to identify and access the asset directory associated with the backup operation, and subsequently identify and access the working directory within the asset directory. An asset directory identifier may be used to differentiate and access an asset directory from other directories on the backup storage system.

In Step 206, the client protection agent initiates the writing of the backup data file image(s) (current present on the client device) the working directory on the backup storage system. In one embodiment of the invention, the backup data file image(s) may be written into the working directory serially or in parallel. Writing backup data file image(s) serially may include writing backup data file images, if there are more than one, one by one. For example, the first backup data file image is written into the working directory. After the first backup data file image is successfully written into the working directory, then the second backup data file image is written into the working directory and so on until all of the backup data file images are successfully written into the working directory. Writing backup data file images in parallel may include writing all of the backup data file images into the working directory at the same time.

In Step 208, a snapshot directory for the user asset on the backup storage system is created through the backup file system interface. In one embodiment of the invention, the snapshot directory may be created to store backup data file images generated during the backup operation. The snapshot directory may include backup data file images or clones thereof that may be used to restore the user asset for, which the backup data file images are associated with, to a particular point in time. Snapshot directories and the backup data file images within each may be used to restore the associated user asset to different points in time depending on the creation time of the data file images used to restore the user asset.

In Step 210, the client protection agent, via the backup file system interface, initiates cloning of the backup data file image(s) from the working directory into the snapshot directory. In one embodiment of the invention, cloning of a given backup data file image may entail generating a pointer-based snapshot of the given backup data file image. That is, rather than cloning or copying the physical database data itself, associated with the given backup data file image, generation of a pointer-based snapshot exercises the cloning or copying of the backup data file image content recipe (described above). Subsequently, the cloning process of any given backup data file image is rapid despite the physical storage space consumed by the associated physical database data; and, further, the cloning process results in the obtaining of a backup data file image copy for each backup data file image, which consumes little to no physical storage capacity as discussed above. Moreover, in another embodiment of the invention, for each given backup data file image that was cloned, which had been stored in a first directory path (i.e., the working directory), the respective backup data file images may be stored in a second directory path (i.e., the snapshot directory) on the backup storage system.

In Step 212, a recovery catalog maintained on a system asset on the client device is accessed through an asset application programming interface (API) (not shown). In one embodiment of the invention, the asset API may enable the client device and/or entities on the client device to access and modify data files on the system asset of the client device as discussed above. Furthermore, the recovery catalog may include metadata regarding backup operations and associated data file images stored in the backup storage system as discussed above (e.g., see FIG. 1B).

In Step 214, the recovery catalog is updated based on the backup data file image(s) stored in the snapshot directory. Updating the recovery catalog may entail the client device obtaining information, via backup file system interface, the about the existence of the new backup data file image(s) generated and stored in snapshot directory of the backup storage system during the incremental or full backup operation. In one embodiment of the invention, the recovery catalog may be updated to include metadata regarding the full backup operation and the new backup data file image(s) included therein. The metadata included in the recovery catalog may be, for example, timestamps encoding dates and/or times during which the new backup data file image(s) had been stored into the snapshot directory and/or synthesized in the working directory; backup identifiers or names associated with the new backup data file image(s); a directory path in the backup file system at which the new full backup data file image(s) may be found, etc.

In Step 216, a backup control file image(s) of a user asset control file(s) stored on the client device is/are generated. Further, the backup control file image(s) may be generated in deduplicated form and, thus, may include an control file backup content recipe. A content recipe may refer to a sequence of chunk identifiers (or pointers) associated with (or directed to) unique database data chunks indexed in physical storage—e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the control file backup content recipe may convey a sequence of fingerprints collectively representative of the undeduplicated control file backup content.

In Step 218, a backup parameter file image(s) of a user asset parameter file(s) stored on the client device is/are generated. Further, the backup parameter file image(s) may be generated in deduplicated form and, thus, may include an parameter file backup content recipe. A content recipe may refer to a sequence of chunk identifiers (or pointers) associated with (or directed to) unique database data chunks indexed in physical storage—e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the parameter file backup content recipe may convey a sequence of fingerprints collectively representative of the undeduplicated parameter file backup content.

In Step 220, the backup control file image(s) and the parameter file image(s) are written into the snapshot directory through the backup file system interface instead of the control file directory. Storing the backup control file image(s) and the parameter file image(s) in the snapshot directory may result in a self-contained backup that may simplify the restoration of the associated user asset and provide seamless live-mounting. In one or more embodiments of the invention, the backup control and parameter file image(s) may be written into the snapshot directory serially or in parallel. Writing backup control and parameter file image(s) serially may include writing backup control or parameter file images, if there are more than one, one by one. For example, the first backup control or parameter file image is written into the snapshot directory. After the first backup control or parameter file image is successfully written into the snapshot directory, then the second backup control or parameter file image is written into the snapshot directory and so on until all of the backup control and parameter file images are successfully written into the snapshot directory. Writing backup control and parameter file images in parallel may include writing all of the backup control and parameter file images into the snapshot directory at the same time.

The method may end following Step 220.

Figure 3:
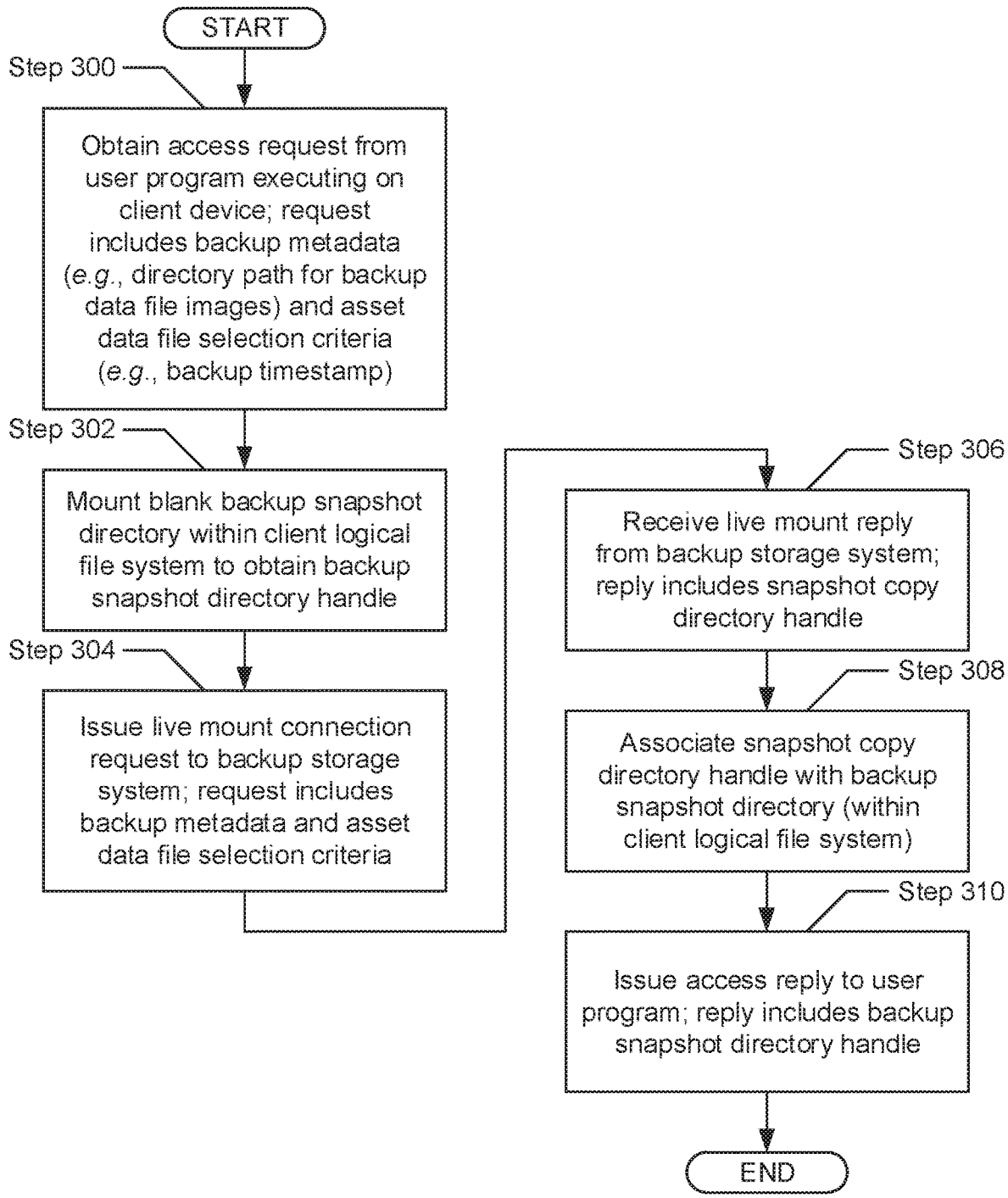
FIG. 3 shows a flowchart describing a method for client-side seamless database backup live-mounting using self-contained database backups in accordance with one or more embodiments of the invention.

FIG. 3 shows a flowchart describing a method for client-side seamless database backup live-mounting using self-contained database backups in accordance with one or more embodiments of the invention. The various steps outlined below may be performed by the client mounting agent (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, an access request from a user program executing on the client device is obtained. In one embodiment of the invention, the request may include backup metadata and asset data file selection criterion (or criteria). The backup metadata may include a directory path for backup data file images. The directory path may uniquely identify a directory in which the backup data files are stored. The backup metadata may include other information regarding the desired backup and the associated backup data files to be mounted without departing from the scope of the invention. The asset data file selection criterion (or criteria) may include, for example, a backup timestamp. The backup timestamp may refer to an arbitrary-length character string that may uniquely identify a given time a particular backup operation was performed and/or backup data files were generated.

In Step 302, the backup snapshot directory is mounted within the client logical file system to obtain the backup snapshot directory handle. Further, the backup snapshot directory may be mounted at a given mount point within the client logical file system (described above) (see e.g., FIG. 1B). Also, a mount point may refer to a directory path through which the backup database data, retained amongst the backup storage system, may be accessed logically by at least the user program whom had submitted the access request (obtained in Step 200). Moreover, following the creation and mounting of the backup snapshot directory, a backup snapshot directory handle may be obtained. The backup snapshot directory handle may represent a referencing object, assigned by the client operating system on the client device, which may be used by the user program(s) to logically access the backup database data retained amongst the backup snapshot directory.

In Step 304, the live mount connection request is issued to the backup storage system. In one embodiment of the invention, the request may include backup metadata and asset data file selection criterion (or criteria). In one embodiment of the invention, each live mount connection request may be directed to the backup storage system (i.e., reachable using the network address and port specified in the backup metadata for a given backup asset) from the appropriate client device. Further, each live mount connection request may include at least a portion of the backup metadata (e.g., a directory path and/or a global asset name) and/or the asset data file selection criterion (or criteria) for a given backup data file in the backup snapshot directory.

In Step 306, the live mount reply is received form the backup storage system. In one embodiment of the invention, each live mount reply may be received from the backup storage system in response to a corresponding live mount connection request (issued in Step 304) thereto. Further, each live mount reply may include a snapshot copy directory handle. A snapshot copy handle may represent a referencing object, assigned by the backup operating system on the appropriate backup storage system, which may be used by the user program(s), on the client device, to logically access backup database data particularly maintained on a given backup snapshot directory.

In Step 308, the snapshot copy directory handle is associated with the backup snapshot directory within the client logical file system. In one embodiment of the invention, associating the snapshot copy directory with the backup snapshot directory within the client logical file system may configure and expose an application programming interface (API) through which file operations, invoked by the user program(s), may remotely access and manipulate the backup database data retained amongst the backup snapshot directory through live-mounting (described above) (see e.g., FIG. 1B).

In Step 310, an access reply is issued to the user program. The user program to which the access reply is issued may be the same user program from which the access request had been obtained in Step 300. In one embodiment of the invention, the access reply may include the snapshot directory handle. The user program may then use the snapshot directory handle to access content in the backup snapshot directory.

The method may end following step 310.

Figure 4:
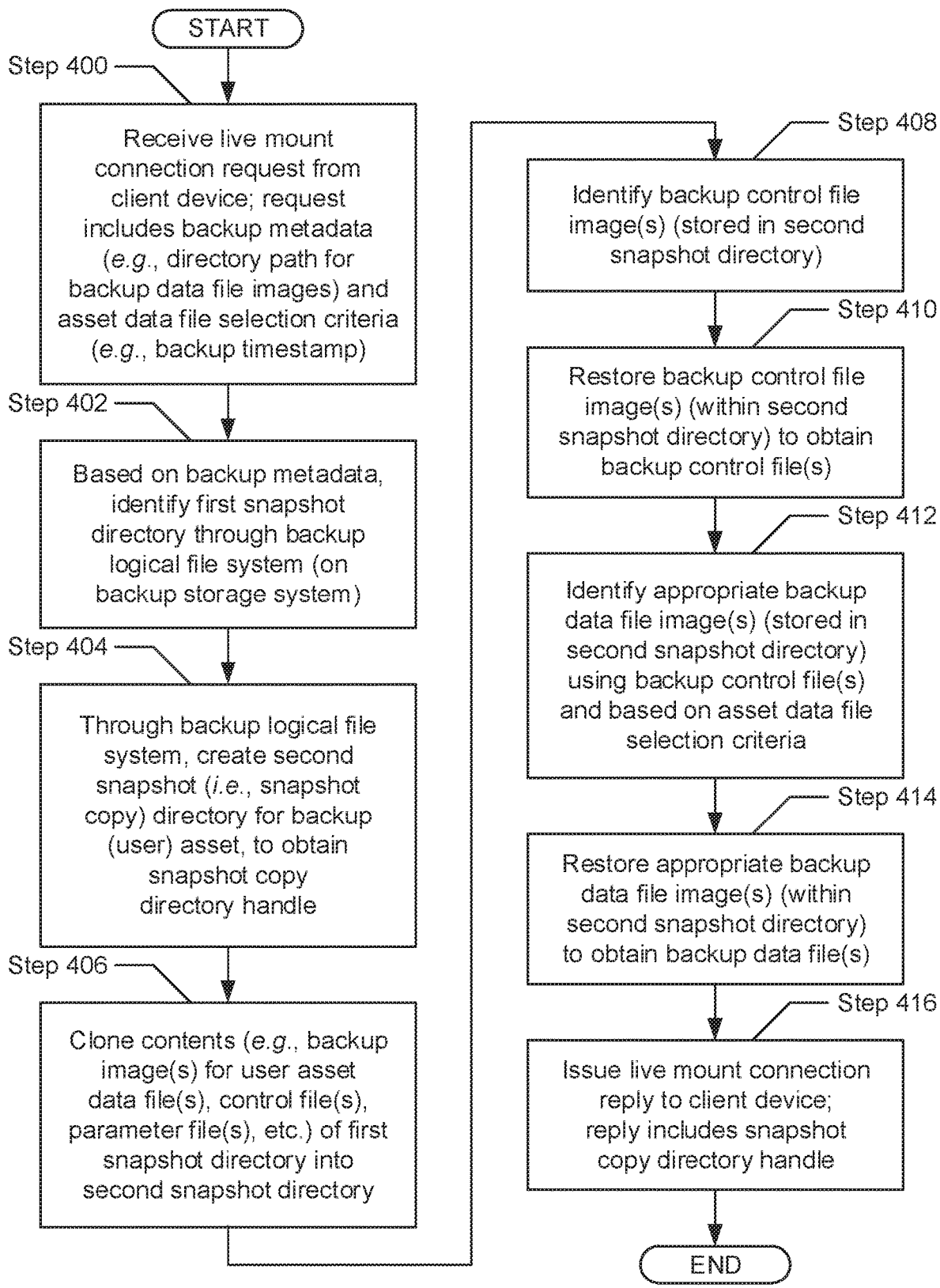
FIG. 4 shows a flowchart describing a method for storage-side seamless database backup live-mounting using self-contained database backups in accordance with one or more embodiments of the invention.

FIG. 4 shows a flowchart describing a method for storage-side seamless database backup live-mounting using self-contained database backups in accordance with one or more embodiments of the invention. The various steps outlined below may be performed by the backup mounting agent (see e.g., FIG. 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a live mount connection request is received from a client device. In one embodiment of the invention, the live mount connection request may pertain to accessing backup asset (i.e., database) data—in entirety or at a granular level—stored on the backup storage system. Further, the request may include backup metadata and asset data file selection criterion (or criteria). The backup metadata (described above) (see e.g., FIG. 3) associated with a given backup asset may include a directory path for backup data file images. The asset data file selection criterion (or criteria) (further described above) (see e.g., FIG. 3) defining or identifying particular database data maintained on the given snapshot directory may include, for example, a backup timestamp.

In Step 402, the first snapshot directory is identified based on the backup metadata through the backup logical file system on the backup storage system. As discussed above, backup metadata may encompass information descriptive of the backup asset status and structure. By way of examples, the backup metadata may include a directory path for backup data file images, the global file image name(s) and storage location(s) of one or more data files associated with the first snapshot directory, and a creation timestamp encoding the date and/or time marking the creation of the first snapshot directory. Furthermore, in one embodiment of the invention, the first snapshot directory may be identified based on at least a portion of the backup metadata (e.g., directory path) (received in Step 300).

In Step 404, a second snapshot directory is created for the backup user asset through the backup logical file system to obtain a snapshot copy directory handle. In one embodiment of the invention, the second snapshot directory may be a snapshot copy of the first snapshot directory.

In Step 406, the contents of the first snapshot directory are cloned into the second snapshot directory. In one or more embodiments of the invention, the contents cloned from the first snapshot directory to the second snapshot directory may include one or more backup images for user asset data file(s), control file(s), parameter file(s), and any other file(s) stored in the first snapshot directory. In one embodiment of the invention, cloning of a given backup asset data file may entail generating a pointer-based snapshot of the given backup asset data file. That is, rather than cloning or copying the physical database data itself, associated with the given backup asset data file, generation of a pointer-based snapshot exercises the cloning or copying of the backup asset content recipe (described above). Subsequently, the cloning process of any given backup asset data file is rapid despite the physical storage space consumed by the associated physical database data; and, further, the cloning process results in the obtaining of a backup asset data file copy for each backup asset data file, which consumes little to no physical storage capacity.

In Step 408, the backup control file image(s) stored in the second snapshot directory is/are identified. In one embodiment of the invention, a control file image may refer to an image of a database object for storing backup asset metadata.

In Step 410, the backup control file image(s) is restored within the second snapshot directory to obtain a backup control file(s). As a result, the backup control file(s), in conjunction with the asset data file selection criterion (or criteria), may be used within the second snapshot directory to identify appropriate backup data file image(s) within the second snapshot directory.

In Step 412, the appropriate backup data file image(s) stored in the second snapshot directory is/are identified using the backup control file(s) and based on the asset data file selection criterion (or criteria). By way of an example, the asset data file selection criterion (or criteria) may include a creation timestamp. The control file may include the creation timestamp of all the backup data file images in the second snapshot directory. The backup data file image(s) that include the creation timestamp from the asset data file selection criterion (or criteria) may be identified as the appropriate backup data file image(s).

In Step 414, the appropriate backup data file image(s) within the second snapshot directory is/are restored to obtain the backup data file(s). The obtained backup data file(s) may now be available for live-mounting.

In Step 416, a live mount connection reply is issued to the client device. In one embodiment of the invention, the reply may include the snapshot copy directory handle. Further, the live mount connection reply may be directed to the client device (from which the live mount connection request had been received in Step 400).

The method may end following Step 416.

Figure 5:
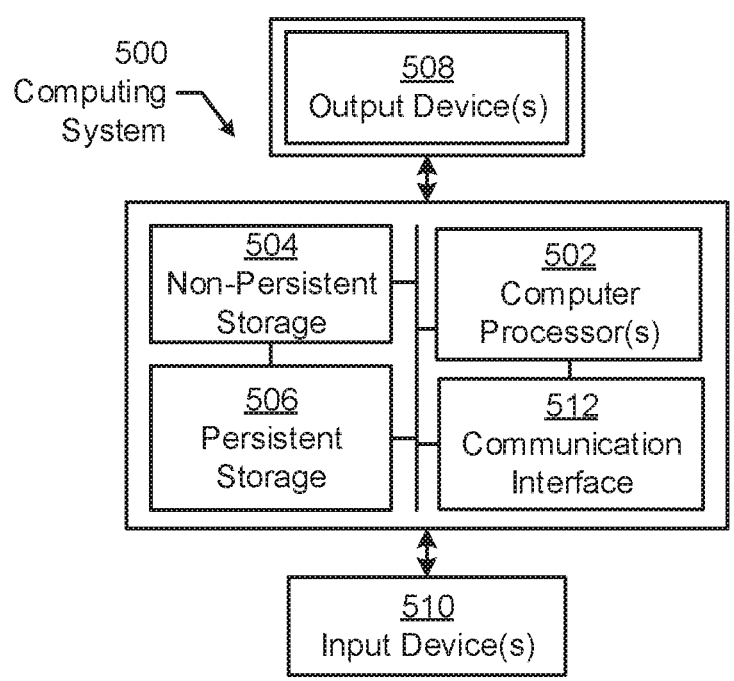
FIG. 5 shows an exemplary computing system in accordance with one or more embodiments of the invention.

FIG. 5 shows an exemplary computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing backup data, comprising:
receiving a live mount connection request from a client device;
in response to the live mount connection request:
generating a directory;
populating the directory with a backup control file image and a plurality of pointers to backup data file images in a second directory, wherein the backup control file image is obtained from the second directory;
restoring at least a portion of the backup data file images in the directory using the backup control file image and at least a portion of the backup data file images in the second directory;
providing after the restoring, a handle to the directory to the client device.

2. The method of claim 1, further comprising:
prior to receiving the live mount connection request:
obtaining the backup data file images from the client device;
obtaining the backup control file image from the client device; and
storing the backup data file images and the backup control file image in the second directory.

3. The method of claim 1, wherein restoring at least the portion of the backup data file images in the directory using the backup control file image and at least the portion of the backup data file images in the second directory comprises:
restoring backup control files the backup control file image, wherein restoring at least the portion of the backup data file images in the directory comprises using the backup control files.

4. The method of claim 3, wherein restoring at least the portion of the backup data file images in the directory using the backup control file image and at least the portion of the backup data file images in the second directory comprises further comprises:
obtaining asset data file selection criterion from the client device, wherein restoring at least the portion of the backup data file images in the directory further comprises using the asset data file selection criterion.

5. The method of claim 4, wherein the live mount connection request specifies the asset data file selection criterion.

6. The method of claim 4, wherein the asset data file selection criterion comprises a timestamp.

7. The method of claim 1, wherein the live mount connection request specifies a directory path to the backup data file images, wherein the directory path corresponds to the second directory.

8. A system, comprising:
a processor;
a backup mounting agent, which when executed by the processor performs a method, the method comprising:
receiving a live mount connection request from a client device;
in response to the live mount connection request:
generating a directory;
populating the directory with a backup control file image and a plurality of pointers to backup data file images in a second directory, wherein the backup control file image is obtained from the second directory;
restoring at least a portion of the backup data file images in the directory using the backup control file image and at least a portion of the backup data file images in the second directory;
providing, after the restoring, a handle to the directory to the client device.

9. The system of claim 8, wherein the method further comprises:
prior to receiving the live mount connection request:
obtaining the backup data file images from the client device;
obtaining the backup control file image from the client device; and
storing the backup data file images and the backup control file image in the second directory.

10. The system of claim 8, wherein restoring at least the portion of the backup data file images in the directory using the backup control file image and at least the portion of the backup data file images in the second directory comprises:
restoring backup control files the backup control file image, wherein restoring at least the portion of the backup data file images in the directory comprises using the backup control files.

11. The system of claim 10, wherein restoring at least the portion of the backup data file images in the directory using the backup control file image and at least the portion of the backup data file images in the second directory further comprises:
obtaining asset data file selection criterion from the client device, wherein restoring at least the portion of the backup data file images in the directory further comprises using the asset data file selection criterion.

12. The system of claim 11, wherein the live mount connection request specifies the asset data file selection criterion.

13. The system of claim 11, wherein the asset data file selection criterion comprises a timestamp.

14. The system of claim 8, wherein the live mount connection request specifies a directory path to the backup data file images, wherein the directory path corresponds to the second directory.

15. A non-transitory computer readable medium comprising computer readable program code, which when executed by a computer processor enables the computer processor to perform a method for accessing backup data, the method comprising:
receiving a live mount connection request from a client device;
in response to the live mount connection request:
generating a directory;
populating the directory with a backup control file image and a plurality of pointers to backup data file images in a second directory, wherein the backup control file image is obtained from the second directory;
restoring at least a portion of the backup data file images in the directory using the backup control file image and at least a portion of the backup data file images in the second directory;

providing, after the restoring, a handle to the directory to the client device.

16. The non-transitory computer readable medium of claim 15, wherein the method further comprises:

prior to receiving the live mount connection request:
obtaining the backup data file images from the client device;
obtaining the backup control file image from the client device; and
storing the backup data file images and the backup control file image in the second directory.

17. The non-transitory computer readable medium of claim 15, wherein restoring at least the portion of the backup data file images in the directory using the backup control file image and at least the portion of the backup data file images in the second directory comprises:

restoring backup control files the backup control file image, wherein restoring at least the portion of the backup data file images in the directory comprises using the backup control files.

18. The non-transitory computer readable medium of claim 17, wherein restoring at least the portion of the backup data file images in the directory using the backup control file image and at least the portion of the backup data file images in the second directory further comprises:

obtaining asset data file selection criterion from the client device, wherein restoring at least the portion of the backup data file images in the directory further comprises using the asset data file selection criterion.

19. The non-transitory computer readable medium of claim 18, wherein the live mount connection request specifies the asset data file selection criterion.

20. The non-transitory computer readable medium of claim 18, wherein the asset data file selection criterion comprises a timestamp.

* * * * *